US008000574B2

(12) United States Patent
Buchter et al.

(10) Patent No.: US 8,000,574 B2
(45) Date of Patent: Aug. 16, 2011

(54) METHOD OF GENERATING SUPERCONTINUUM OPTICAL RADIATION, SUPERCONTINUUM OPTICAL RADIATION SOURCE, AND USE THEREOF

(75) Inventors: Scott Charles Buchter, Helsinki (FI); Hanne Elisabeth Ludvigsen, Helsinki (FI); Matti Kaivola, Helsinki (FI)

(73) Assignee: NKT Photonics A/S, Birkerod (DK)

( * ) Notice: Subject to any disclaimer, the term of this patent is extended or adjusted under 35 U.S.C. 154(b) by 517 days.

(21) Appl. No.: 10/586,527

(22) PCT Filed: Jan. 24, 2005

(86) PCT No.: PCT/EP2005/050294
§ 371 (c)(1),
(2), (4) Date: Jul. 19, 2006

(87) PCT Pub. No.: WO2005/071483
PCT Pub. Date: Aug. 4, 2005

(65) Prior Publication Data
US 2008/0226242 A1    Sep. 18, 2008

Related U.S. Application Data

(60) Provisional application No. 60/538,213, filed on Jan. 23, 2004.

(30) Foreign Application Priority Data

Jan. 23, 2004 (DK) ................. 2004 00091

(51) Int. Cl.
*G02B 6/02* (2006.01)
*H01J 65/08* (2006.01)
(52) U.S. Cl. .................... 385/123; 250/459.1
(58) Field of Classification Search .......... 385/122, 385/123; 359/240, 328, 333; 372/21; 250/459.1
See application file for complete search history.

(56) References Cited

U.S. PATENT DOCUMENTS
4,847,850 A * 7/1989 Kafka et al. ............. 372/71
(Continued)

FOREIGN PATENT DOCUMENTS
CA    2 384 325 A1    3/2001
(Continued)

OTHER PUBLICATIONS

Husakou A V et al.: "Supercontinuum generation in photonic crystal fibers made from highly nonlinear glasses"; Appl. Phys. B 77, 227-234 (2003); XP002296069.

(Continued)

*Primary Examiner* — K. Cyrus Kianni
(74) *Attorney, Agent, or Firm* — Buchanan Ingersoll & Rooney PC

(57) ABSTRACT

A method of generating supercontinuum optical radiation, the method comprising: (a) providing an optical waveguide (22), said optical waveguide exhibiting a dispersion characteristic of guided optical radiation, said dispersion characteristic comprising: (i) a first dispersion parameter ($\beta_{21}$) at a first wavelength ($\lambda_1$), (ii) a second dispersion parameter ($\beta_{22}$) at a second shorter wavelengths ($\lambda_2$), and (iii) a zero-dispersion parameter at a wavelength in between said first and said second shorter wavelengths; said optical waveguide further comprising at least one entrance for receiving optical radiation, and at least one exit for emitting guided optical radiation; (b) applying at least two laser radiation of said first (25) wavelength, ($\lambda_1$) at a first power ($P_1$) and applying laser radiation of said second (26) shorter wavelength ($\lambda_2$) at a second power ($P_2$) into said optical waveguide, said laser radiations at least partially overlapping between said at least one entrance and said at least one exit of said optical waveguide; and (c) phase-matching said applied laser radiations by adjusting said first and second powers; a supercontinuum optical radiation source; and use thereof.

16 Claims, 4 Drawing Sheets

U.S. PATENT DOCUMENTS

| | | | |
|---|---|---|---|
| 6,097,870 | A | 8/2000 | Ranka et al. |
| 6,480,656 | B1 | 11/2002 | Islam et al. |
| 6,724,783 | B2 * | 4/2004 | Jalali et al. .................. 372/9 |
| 6,856,737 | B1 * | 2/2005 | Parker et al. ................ 385/122 |
| 7,190,705 | B2 * | 3/2007 | Fermann et al. ............... 372/18 |
| 7,266,275 | B2 * | 9/2007 | Hansen et al. ................ 385/125 |
| 7,356,053 | B2 * | 4/2008 | Khaydarov ................... 372/18 |
| 2002/0067747 | A1 * | 6/2002 | Jalali et al. ................ 372/9 |
| 2002/0071645 | A1 | 6/2002 | Hogan |
| 2003/0012495 | A1 | 1/2003 | Islam et al. |
| 2004/0057682 | A1 * | 3/2004 | Nicholson et al. ............ 385/122 |
| 2004/0233944 | A1 * | 11/2004 | Dantus et al. ................ 372/25 |
| 2005/0047739 | A1 * | 3/2005 | Parker et al. ................ 385/122 |
| 2006/0056468 | A1 * | 3/2006 | Dantus et al. ................ 372/28 |
| 2006/0104582 | A1 * | 5/2006 | Frampton et al. ............. 385/123 |
| 2006/0187974 | A1 * | 8/2006 | Dantus ....................... 372/9 |
| 2007/0242956 | A1 * | 10/2007 | Inui et al. .................. 398/177 |

FOREIGN PATENT DOCUMENTS

| | | |
|---|---|---|
| CA | 2384325 A1 | 3/2001 |
| JP | 11-119269 A | 4/1999 |
| JP | 11119269 | 4/1999 |
| WO | 0176026 A1 | 10/2001 |
| WO | WO 01/76026 A1 | 10/2001 |

OTHER PUBLICATIONS

Karasawa N et al.: "Generation of intense ultrabroadband optical pulses by induced phase modulation in an argon-filled single-mode hollow waveguide"; Optics Letters, vol. 25, No. 3, Feb. 2000; XP002296070.

Spanner M et al.: "Controlled supercontinuum generation for optimal pulse compression: a time-warp analysis of nonlinear propagation of ultra-broad-band pulses"; Applied Physics B 77, 329-336 (2003); XP002296071.

Kalashnikov V L et al.: "Maximization of supercontinua in photonic crystal fibers by using double pulses and polarization effects";Appl. Phys. B 77, 319-324 (2003); XP002296072.

Hilligsøe K M et al.: "Initial steps of supercontinuum generation in photonic crystal fibers"; J. Opt. Soc. Am. B, vol. 20, No. 9, Sep. 2003, pp. 1887-1893; XP002296073.

Champert P-A, et al.: "White-light supercontinuum generation in normally dispersive optical fiber using original multi-wavelength pumping system", Optics Express, vol. 12, No. 19, Sep. 20, 2004, pp. 4366-4371; XP002327132.

Provino et. al. "Compact broadband continuum source based on microchip laser pumped microstructured fiber", Electronic Lett. 37, 558-559, 2001.

Husakou A V et al.: "Supercontinuum generation in photonic crystal fibers made from highly nonlinear glasses"; Appl. Phys. B 77, 227-234 (2003); XP002296069.

Karasawa N et al.: "Generation of intense ultrabroadband optical pulses by induced phase modulation in an argon-filled single-mode hollow waveguide"; Optics Letters, vol. 25, No. 3, Feb. 2000; XP002296070.

Spanner M et al.: "Controlled supercontinuum generation for optimal pulse compression: a time-warp analysis of nonlinear progation of ultra-broad-band pulses"; Applied Physics B 77, 329-336 (2003); XP002296071.

Kalashnikov V L et al.: "Maximization of supercontinua in photonic crystal fibers by using double pulses and polarization effects"; Appln. Phys. B 77, 319-324 (2003); XP002296072.

Hilligsoe K M et al.: "Initial steps of supercontinuum generation in photonic crystal fibers"; J. Opt. Soc. Am. B, vol. 20, No. 9, Sep. 2003, pp. 1887-1893; XP002296073.

Champert P-A et al.: "White-light supercontinuum generation in normally dispersive optical fiber using original multi-wavelength pumping system", Optics Express, vol. 12, No. 19, Sep. 20, 2004, pp. 4366-4371; XP002327132.

Provino et. al. "Compact broadband continuum source based on microchip laser pumped microstructured fiber", Electronic Lett. 37, 558-559, 2001.

* cited by examiner

METHOD OF GENERATING SUPERCONTINUUM OPTICAL RADIATION, SUPERCONTINUUM OPTICAL RADIATION SOURCE, AND USE THEREOF

1. BACKGROUND OF THE INVENTION

The present invention relates to a method of generating a supercontinuum of optical radiation in an optical waveguide, a supercontinuum optical radiation source, and use thereof, e.g. in telecommunication, spectroscopy, and tomography.

1. The Technical Field

A supercontinuum radiation source is a light source which exhibits broad flat "white" spectrum and laser-like properties of high output power and high degree of spatial coherence compared to thermal light sources.

Conventionally supercontinuum optical radiation is generated by propagating sub-nanoseconds ($<10^{-10}$ s) single wavelength laser pulses through a nonlinear material. For sufficiently intense ($>10^{10}$ W) laser pulses, which can be achieved by high power lasers, a supercontinuum of optical radiation will be generated in the nonlinear material. Virtually any nonlinear material can be applied, including e.g. water.

Interactions of the laser radiation and the nonlinear material generating a supercontinuum include nonlinear processes such as self-phase modulation (SPM), cross-phase modulation (XPM), stimulated Raman scattering (SRS), and four-wave mixing (FWM) all of which may contribute to the generated supercontinuum.

For a nonlinear material in form of a high quality optical fibre confining light in a small cross sectional area over long distances, a supercontinuum can be generated by low power laser sources.

For short pulses e.g. less than about 10 picoseconds all of the above-mentioned nonlinear interactions can be responsible for supercontinuum generation in optical fibres. The extent to which each interaction contributes to the spectral broadening is determined by a combination of the characteristics of the laser radiation and the fibre parameters.

In order for four-wave mixing to efficiently contribute to the formation of the supercontinuum the interacting fields must be phase matched. It has long been understood that this requires a pump wavelength close to the zero dispersion wavelength of the optical fibre in use. For standard telecommunications fibre this is usually near 1300 or 1550 nm in the infrared. The recent development of so called photonic crystal, microstructured, or holey fibre has resulted in fibres with much shorter zero dispersion wavelengths around 800 nm. These fibres, combined with expensive mode-locked titanium sapphire pump lasers, have demonstrated broad supercontinuum sources in the visible region of the spectrum.

However, mode locked lasers are complicated and expensive. It is thus desirable to produce supercontinuum sources using longer pulse lasers such as Q-switched lasers or purely continuous wave lasers. For the case of lasers with pulses longer than several tens of picoseconds or continuous wave output, the effects of self and cross-phase modulation on the spectral width of the input pulse are negligible for the purpose of supercontinuum generation. Stimulated Raman scattering and four-wave mixing are thus the interactions which can be utilized.

SRS does not require phase-matching and hence can be used for the generation of new frequencies with basically any pump wavelength/fibre combination. However, the resulting spectrum is not smooth, with peaks at intervals spaced by the characteristic frequency shifts of the fibre material. In addition, the spectrum is primarily shifted to wavelengths longer than the pump.

What is needed is an efficient technique for generating spectrally smooth, single-mode supercontinuum radiation using readily available, low cost, pump lasers.

2. Prior Art Disclosures

U.S. Pat. No. 4,847,850 (Kafka, Linne, and Baer) disclose stimulated Raman scattering using compact acousto-optically Q-switched pump lasers operating at 1064 or 532 nm and standard single-mode fibres. In the case of 532 nm pumping they were able to generate a continuum which extended from the green to the near infrared. With pumping at 1064 nm they demonstrated continua in the infrared which extended to 1500 nm.

Provino et. al. "Compact broadband continuum source based on microchip laser pumped microstructured fiber", Electronic Lett. 37, 558-559, 2001 discloses visible supercontinuum generation in photonic crystal fibers with a 532 nm passively Q-switched pump laser from JDSU which filters out the longer wavelengths. In addition to SRS they observed four-wave mixing processes phase matched through higher order fibre modes which resulted in the generation of wavelengths shorter than the pump. The supercontinuum extended as short as 400 nm but with low efficiency due to the poor mode overlap of the interacting fields. The output beam was also not diffraction limited which is undesirable for many applications. The characteristic of the fiber used is however not specified.

U.S. Pat. No. 6,097,870 discloses broad band continuum generation in the visible spectrum using an optical fiber with a zero-dispersion at a visible wavelength and use of 100 fs pulses at 780 nm with 8 kW peak power.

2. DISCLOSURE OF THE INVENTION

Object of the Invention

In an aspect, it is the object of the present invention to seek to provide a method of generating an improved supercontinuum optical radiation, in particular a supercontinuum optical radiation which is extended into the blue-to-UV region of the spectrum.

In another aspect, it is the object of the present invention to seek to provide an improved supercontinuum radiation source, in particular a supercontinuum optical radiation source which is extended into the blue-to-UV region of the spectrum, more particular such a supercontinuum optical radiation source which do not require short pulsed pico- and femto-seconds high power lasers.

In still another aspect it is the object of the present invention to provide use for a supercontinuum radiation source in various applications including telecommunication, spectroscopy, and tomography.

Further objects appear from the description elsewhere.

Solution According to the Invention

"Method of Generating Supercontinuum Optical Radiation"

According to the present invention, these objects are fulfilled by providing a method of generating supercontinuum optical radiation, the method comprising:

(a) providing an optical waveguide, said optical waveguide exhibiting a dispersion characteristic of guided optical radiation, said dispersion characteristic comprising:

(i) a first dispersion parameter $\beta_{21}$ at a first wavelength $\lambda_1$,
(ii) a second dispersion parameter $\beta_{22}$ at a second shorter wavelengths $\lambda_2$, and
(iii) a zero-dispersion parameter at a wavelength in between said first and said second shorter wavelengths;
said optical waveguide further comprising at least one entrance for receiving optical radiation, and at least one exit for emitting guided optical radiation;
(b) applying at least two fields of laser radiation of, respectively, said first wavelength $\lambda_1$ at a first power $P_1$ and of said second shorter wavelength $\lambda_2$ at a second power $P_2$ into said optical waveguide, said laser radiations at least partially overlapping between said at least one entrance and said at least one exit of said optical waveguide; and
(c) phase-matching said applied laser radiations by adjusting said first and second powers;
whereby it is obtained that the negative phase mis-match factor of the dispersion of the waveguide, and optionally the positive mis-match factor of the overlap of said laser radiations can be compensated by a positive mis-match factor of the power of the laser radiations applied and thereby ensuring the generation of the supercontinuum.

The term 'having a zero-dispersion parameter at a given wavelength' is taken to mean having a dispersion parameter ($\beta$) substantially equal to 0 at said given wavelength (typically termed the zero dispersion wavelength).

Preferably the supercontinuum optical radiation spans a range of wavelengths larger than 100 nm, such as larger than 200 nm, such as larger than 300 nm, such as larger than 500 nm, such as larger than 800 nm. Preferably the range of supercontinuum optical radiation is included in the range from 200 to 2200 nm, such as the range from 400 nm to 1600 nm, such as the range from 450 nm to 600 nm, such as in the range from 800 nm to 1000 nm, such as in the range from 1200 nm to 1400 nm.

The output spectrum of the supercontinuum optical radiation may be adapted to specific applications by optimizing dispersion properties of the optical waveguide, the first and second (and possibly more) wavelengths and the optical powers at these wavelengths of the applied laser radiation.

In a particular embodiment, the spectrum of the supercontinuum optical radiation (e.g. its width and its power distribution versus wavelength) is adjusted relative to the first and second wavelengths by adjusting the first and second powers.

Generally, the two wavelengths can be selected at any suitable wavelengths with respect to the zero-dispersion wavelength providing a negative dispersion mis-match factor.

In a preferred embodiment the wavelength difference of said first wavelength with respect to said zero-dispersion wavelength differs from the wavelength difference of said second wavelengths with respect to said zero-dispersion wavelength whereby it is obtained that the first and second shorter wavelength can be positioned non-symmetrically about the zero-dispersion wavelength. Thereby relatively large negative sums ($\beta_{21}+\beta_{22}$) of the dispersion parameters $\beta_{21}$ and $\beta_{22}$ can be obtained for non-symmetrical dispersion curves.

Generally the power of said two laser radiations is selected in a range including sufficient power to generate the supercontinuum and sufficiently low not to destroy the waveguide, i.e. generally in the range from 10 to 10 000 W, or even below 10 000 W for many waveguides.

In a preferred embodiment, the said power adjustment is at least 10 W, preferably at least 50 W, such as at least 100 W, such as at least 1000 W, such as at least 10 000 W whereby negative dispersion factors of a range of photonic crystal fibres can be balanced. The upper limit is determined with respect to maintain a functional fibre without destruction thereof.

Generally, the duration of pulses if a pulsed laser is applied can be is selected sufficiently long for e.g. walk-off to be negligible.

In a preferred embodiment, said at least one laser radiation source is being pulsed with pulses of duration times in the range including 100 ps to 100 ns whereby less expensive pulsed lasers can be used for the laser radiation source.

The pulse duration can be extended to a continuous radiation.

In a preferred embodiment, said at least one laser radiation source is continuous whereby applications for which the use of continuous supercontinuum is preferred can be obtained, e.g. for use in optical coherence tomography.

Generally, the two wavelengths can be generated in any suitable way allowing a phase-match to be established.

In a preferred embodiment, said laser radiation of said second shorter wavelength is a frequency doubled laser radiation of said first wavelength whereby a relatively simple and compact supercontinuum optical radiation source can be obtained. In a particular embodiment, the power of the second shorter wavelength $\lambda_2$ is maximized.

Generally, the waveguide can be any suitable waveguide wherein a sufficient overlap of laser radiation energy can be established.

In a preferred embodiment, said optical waveguide is an optical fibre or a planar waveguide whereby supercontinuum optical radiations sources suitable for fibre optical applications and integrated optical applications, respectively, can be provided.

In case of optical fibres, both standard fibres and photonic crystal fibres can be used.

In a preferred embodiment, said optical fibre is a standard optical fibre or a photonic crystal fibre whereby already existing optical standard fibres can be applied as well as photonic crystal fibres.

Photonic crystal fibres with specifically designed dispersion properties are preferred.

Generally, specific wavelengths are selected depending of the waveguide and the available laser source.

In preferred embodiments said first wavelength is in the range including 1000 to 1100 nm, preferably about 1064 nm, and said second shorter optical wavelength is in the range including 500 to 550 nm, preferably about 532 nm whereby specifically lasers presently available can be applied.

"Supercontinuum Optical Radiation Source"

In another aspect the present invention provides a supercontinuum laser radiation source, the source comprising:
(a) at least one laser radiation source, said laser radiation source being adapted to emit at least a laser radiation of a first wavelength $\lambda_1$ and a laser radiation of a second 26 shorter wavelength $\lambda_2$; and
(b) an optical waveguide, said optical waveguide exhibiting a dispersion characteristic of guided optical radiation, said dispersion characteristic comprising:
(i) a first dispersion parameter $\beta_{21}$ at said first wavelength,
(ii) a second dispersion parameter $\beta_{22}$ at said second shorter wavelength, and
(iii) a zero-dispersion parameter at a wavelength in between said first and said second shorter wavelengths,
said optical waveguide further comprising at least one entrance for receiving optical radiation, and at least one exit for emitting guided optical radiation whereby the mentioned effects and advantages for the method and its preferred embodiments are accomplished in practical embodiments of the supercontinuum source according to the invention.

In a preferred embodiment, said at least one laser radiation source is being pulsed with pulses of duration times in the range including 100 ps to 100 ns.

In a preferred embodiment, said at least one laser radiation source comprises a frequency doubler.

In a preferred embodiment, said at least one laser radiation source comprises a Q-switched laser or a mode-locked laser whereby pulsed supercontinuum lasers making ultra-short pulses are provided, e.g. for use in chemical analysis. In particular Q-switched lasers are cheap and sufficient for most applications. Mode-locked lasers are more expensive but much shorter pulses can be obtained e.g. for studies of chemical reactions.

In a preferred embodiment, said at least one laser radiation source comprises a Q-switched Nd:YAG laser.

In a preferred embodiment, said at least one laser radiation source comprises a laser passively Q-switched with a Cr4+:YAG crystal saturable absorber whereby a passively Q-switched laser is provided.

In a preferred embodiment, said at least one laser radiation source comprises a semiconductor saturable absorber.

In a preferred embodiment, said at least one laser radiation source is continuous.

In a preferred embodiment, said optical waveguide is an optical fibre or a planar waveguide.

In a preferred embodiment, said optical fibre is a standard optical fibre or a photonic crystal fibre.

"Use of Supercontinuum Optical Radiation Sources"

In still another aspect, the present invention provides use of a supercontinuum optical radiation source according to the invention in telecommunication for cost reduction and use of cheap equipment in spectroscopy e.g. in biological spectroscopy using UV and blue absorption for protein analysis, in optical coherence tomography where a large bandwidth is needed, e.g. for studying semiconductor materials, e.g. nitride-containing materials.

"Phase-Matching"

Without being limited to any theory a four-wave mixing model for phase-matching of optical radiation power, pulse overlap and pulse dispersion has been developed.

According to G. Agrawal "Nonlinear Fiber Optics", Academic Press, 2001) the parametric gain for four wave mixing with two pump wavelengths is given by:

$$g = \sqrt{(\gamma P_0 r)^2 - \left(\frac{\kappa}{2}\right)^2}$$

where $\gamma$ is the nonlinear coefficient, $P_0 = P_1 + P_2$ is the total optical radiation power, $r = 2(P_1 P_2)^{1/2}/P_0$ and $\kappa = \Delta\kappa + \gamma(P_1+P_2)$. The phase-matching condition for maximum gain is $\kappa=0$. In the case of two pumping wavelengths this is:

$$0 = \kappa = \gamma(P_1 + P_2) + \Omega(\beta_{12} - \beta_{11}) + \frac{\Omega^2}{2}(\beta_{22} + \beta_{21}) +$$
$$\frac{\Omega^3}{3!}(\beta_{32} - \beta_{31}) + \frac{\Omega^4}{4!}(\beta_{42} + \beta_{41}) + \frac{\Omega^5}{5!}(\beta_{52} - \beta_{51}) \ldots$$

where $$\beta_{ij} = \frac{\partial^i \beta}{\partial \omega_j}$$

is the $i^{th}$ order dispersion parameter for the $j^{th}$ pump beam, $\omega_2 > \omega_1$, and $\Omega$ is the frequency shift for the generated waves. Let us consider only the first three terms in the above equation which are significant, in particular when operated far from the zero dispersion wavelength. So we have:

$$0 = \kappa = \gamma(P_1 + P_2) + \Omega(\beta_{12} - \beta_{11}) + \frac{\Omega^2}{2}(\beta_{22} + \beta_{21})$$

The "power factor" represented by the first term on the right hand side is just the input powers $P_1$ and $P_2$ multiplied by the nonlinear coefficient and so is always positive. The "overlap factor" represented by the second term can be rewritten as:

$$\Omega\left(\frac{v_{g1} - v_{g2}}{v_{g1} v_{g2}}\right)$$

where $v_{g1}$ is the group velocity of the $j^{th}$ pump beam. If the fibre is much shorter than the walk-off length between the two pulses, in the case of pulsed beams, which is generally true for a few meters of fibre and pulses longer than 100 ps, this can be neglected. Consequently, in order to have $\kappa=0$, the third term should be negative. The detailed description illustrates examples of this.

It should be noted that the walk-off parameter, $d_{12}$, is defined as:

$$d_{12} = \frac{v_{g1} - v_{g2}}{v_{g1} v_{g2}}$$

For pulses of width $T_0$, a walk-off length can be defined as:

$$L_W = \frac{T_0}{|d_{12}|}$$

If the fibre is shorter than $L_W$ then the "overlap factor" can be neglected in calculation of efficiency. For example for pulses of 532 and 1064 nm pulses disclosed in the detailed description, $d_{12}$ is about 80 picoseconds/-meter. So, in 10 meters of fibre the walk-off is about 800 picoseconds. Thus for pulses of several nanoseconds walk-off is not contributing significantly to the phase mis-match under these conditions. If the fibre is much longer than the walk-off length, phase-matching still occurs up to the walk-off length but then the efficiency decreases to zero.

It should be noted that the terms D and $\beta_2$ defined by the definition:

$$D = -\frac{2\pi c}{\lambda^2}\beta_2$$

both are referred to as the "dispersion parameter". However, $\beta_2$ is also referred to as the group-velocity dispersion parameter.

DEFINITIONS OF EXPRESSIONS

In the present context the term "supercontinuum source" designates a source of optical radiation which has a broad spectral bandwidth and laser-like beam properties.

Where appropriate the term power means peak power, e.g. in case of pulsed optical radiation.

The term "from a to b" is intended to mean the range from a to b including a and b.

The term "substantially" is intended to mean being largely but not necessary wholly that which is specified.

3. BRIEF DESCRIPTION OF THE DRAWINGS

In the following, by way of examples only, the invention is further disclosed with detailed description of preferred embodiments. Reference is made to the drawings in which FIG. 1a shows a schematic diagram of an a supercontinuum light source according to an embodiment of the present invention; FIG. 1b shows another embodiment of a supercontinuum light source according to the present invention;

4. DETAILED DESCRIPTION

"Supercontinuum Radiation Source"

Figure 1A:
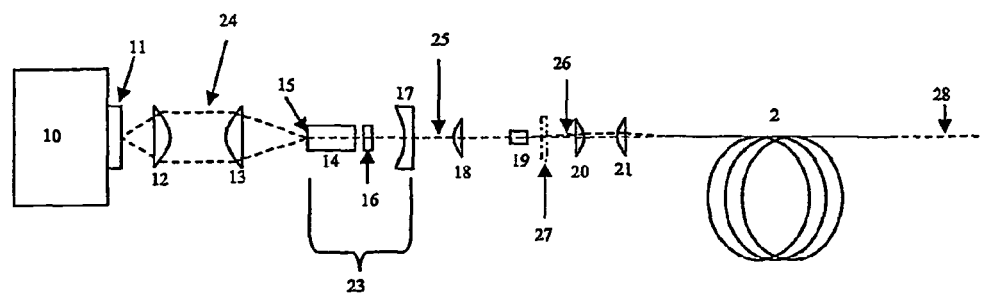

FIG. 1a shows a schematic diagram of a preferred embodiment of a supercontinuum optical radiation source according to the invention, here a supercontinuum laser source.

The supercontinuum laser source comprises at least one laser radiation source emitting laser radiations of at least two wavelengths. A laser diode 11, here part No. 2462-P1 supplied from JDSU, is mounted on a heat sink 10 which is adapted for absorbing heat generated by the laser diode. In operation, this laser diode emits light 24 at a wavelength of 808 nm.

This supercontinuum laser source further comprises collimating means for collimating the emitted light from the laser diode into collimated light 24 by a lens 12, here a converging lens supplied by Thorlabs. A further lens 13, also a converging lens supplied by Thorlabs, focuses the collimated light 24 into a Nd:YAG laser crystal 14, here supplied by JDSU, of an optical resonator 23. The first surface of the laser crystal 14 has a highly transmissive optical coating 15 which transmits the focussed light and which strongly reflects light at the lasing wavelength of the optical resonator, here a lasing wavelength of 1064 nm. The optical resonator further comprises a partially transmissive mirror 17, here supplied by JDSU, transmitting light at the lasing wavelength and together with the reflecting optical coating 15 forming the optical resonator 23.

This supercontinuum laser source further comprises a Cr4+:YAG crystal 16, here supplied by JDSU, which is inserted in the optical resonator 23 to force the laser to operate in a Q-switched mode during operation.

The output laser light 25 at 1064 nm is imaged into a frequency doubler 19, here a potassium titanyl phosphate crystal supplied by JDSU, by lens 18, here a converging lens supplied by Thorlabs. This crystal converts a portion of the output light 25 to second harmonic light 26 at a wavelength of 532 nm.

Figure 4:
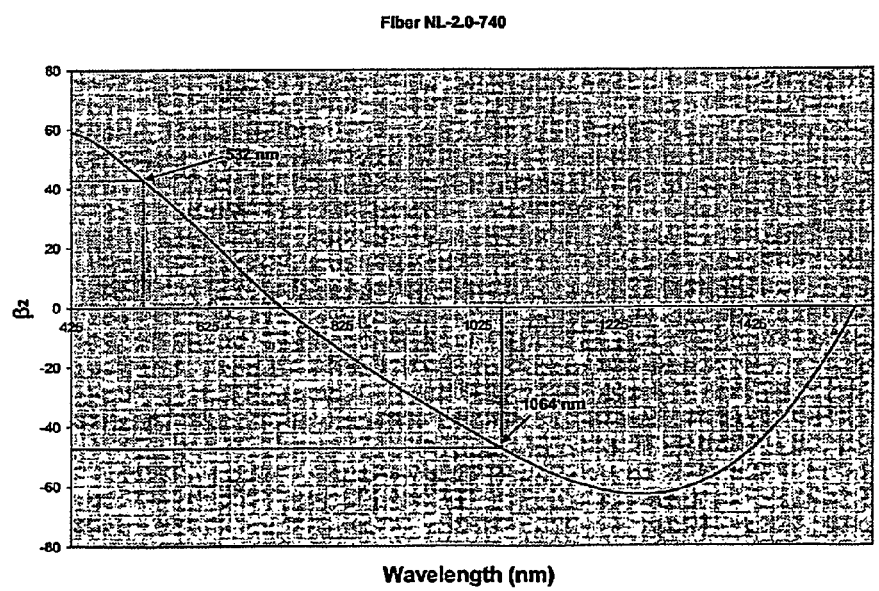
FIG. 4 shows the dispersion parameter versus wavelength of the photonic crystal fibre used for FIG. 2a according to an embodiment of the present invention.

The supercontinuum source further generally comprises coupling means for coupling at least two light beams into the waveguide, here the optical fibre 2. Lens 20, here a converging lens supplied by Thorlabs, collimates and makes parallel the two light beams 25 and 26. Lens 21, here a converging lens supplied by Thorlabs, focuses the two light beams 25 and 26 into a photonic crystal fiber 22, here a NL 740 supplied by Crystal Fibre A/S, Birkeroed, Denmark which has a dispersion parameter versus wavelength as shown in FIG. 4. Alternatively, a NL-1.7-650 photonic crystal fiber from Crystal Fibre A/S can advantageously be used.

Example 1

Comparison Output Spectra—a Single Laser Radiation

Figure 2A:
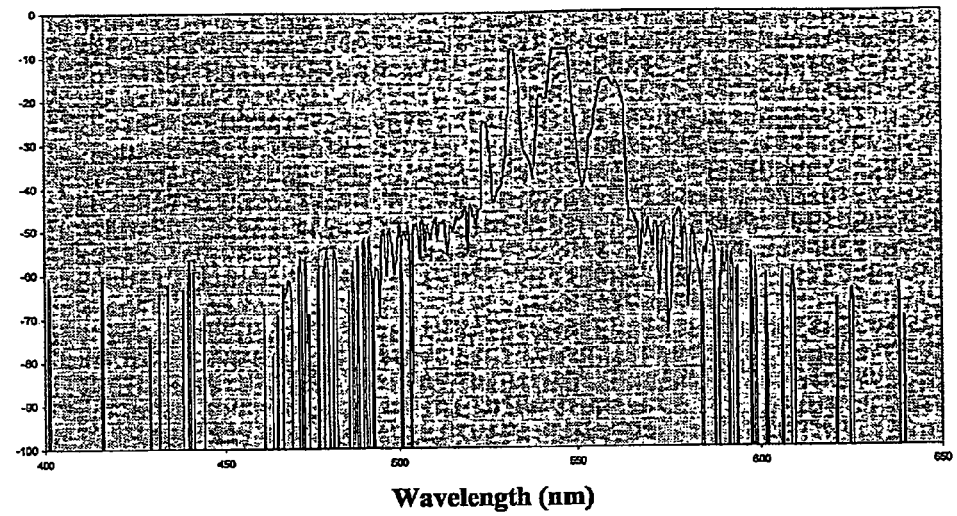
FIG. 2a shows a comparison example of the visible portion of the output spectrum of a photonic crystal fibre pumped with laser radiation of a single wavelength, the selection of wavelengths is not according to the invention.

FIG. 2a shows a comparison example of the visible portion of the output spectrum of a photonic crystal fibre pumped with laser radiation of a single wavelength.

The output spectrum of the light 28 exiting the optical fibre 22, here a NL 740 supplied by Crystal Fibre, Denmark has been measured with an ANDO optical spectrum analyzer for the case where the optical fibre has been pumped with laser radiation of only the second harmonic light 26. In this case the fundamental light 25 was blocked by an optical filter 27 which is substantially transmissive for the second harmonic light 26 and substantially reflective for the fundamental light 25 so that virtually no fundamental light 25 enters the optical fibre 22.

Example 2

Comparison Output Spectra—Two Laser Radiations

Figure 2B:
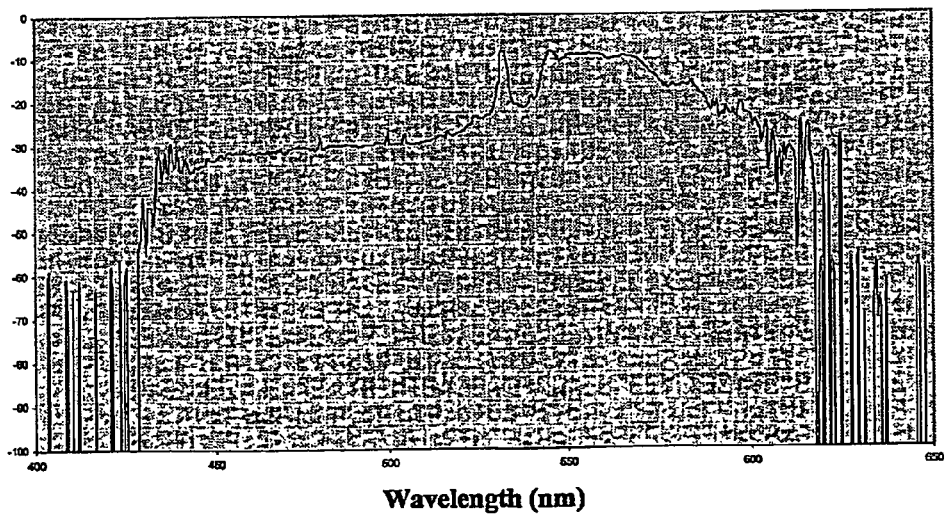
FIG. 2b shows an example of the visible portion of the output spectrum of the photonic crystal fibre used for FIG. 2a pumped with laser radiations of two wavelengths according to the invention.

FIG. 2b shows an example of the visible portion of the output spectrum of the photonic crystal fibre used for FIG. 2a pumped with laser radiations of two wavelengths according to the invention.

The output spectrum of the light 28 exiting fiber 22 shows that the addition of light 25, which is infrared, has the unexpected result of generating a broad visible supercontinuum when the fibre 22 is pumped by both the fundamental light 25 and second harmonic light 26.

Figure 3:
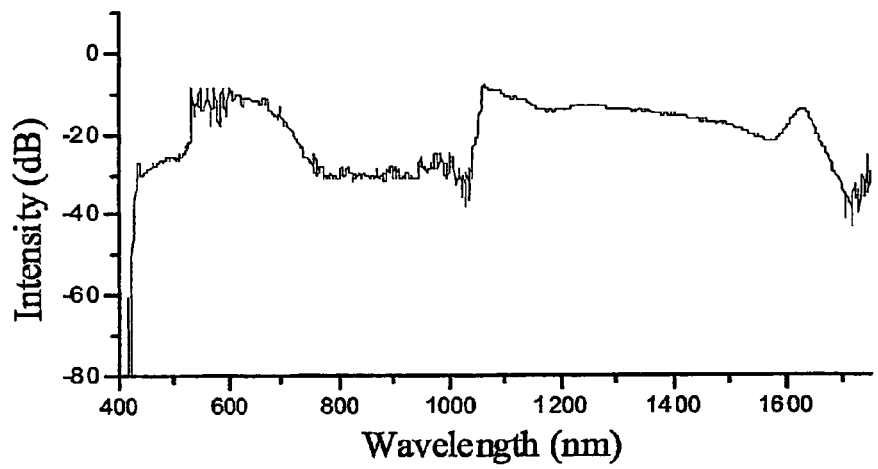
FIG. 3 shows an example of the complete output spectrum of the photonic crystal fibre used for FIG. 2a pumped with laser radiations of two wavelengths according to the invention.

FIG. 3 shows an example of the complete output spectrum of the photonic crystal fibre used for FIG. 2a pumped with two wavelengths according to the invention; the output spectrum of the light 28 exiting the fiber 22 covering the visible and infrared portions of the spectrum.

Example 3

Dispersion Parameter—Wavelength Selection for a Photonic Crystal Fibre

FIG. 4 shows the dispersion parameter versus wavelength of the photonic crystal fibre used for FIG. 2a according to an embodiment of the present invention.

As seen form FIG. 4, the dispersion parameter at the shorter wavelength (532 nm) is positive $\beta_{22}$ but numerically smaller than the dispersion parameter $\beta_{21}$ at the wavelength (1064 nm). Thus, the sum of dispersion parameters $\beta_{21}+\beta_{22}$ of the dispersion parameters $\beta_{21}$ and $\beta_{22}$ is negative and consequently, the dispersion factor is negative.

For operation, this negative dispersion factor can be balanced by adjusting the power factor by adjusting the powers $P_1$ and $P_2$ for the two applied laser radiations. Thus the present photonic crystal fibre can be used for dual wavelength pumped continuum generation according to the invention, e.g. using the system shown in FIG. 1a.

It should be noted that for particularly long fibres wherein the walk-off of pulses can be considerable, the overlap factor would have to compensate by additional power of the two laser radiations. For short fibres, where the walk-off is small, the overlap factor is usually negligible.

Example 4

Figure 5:
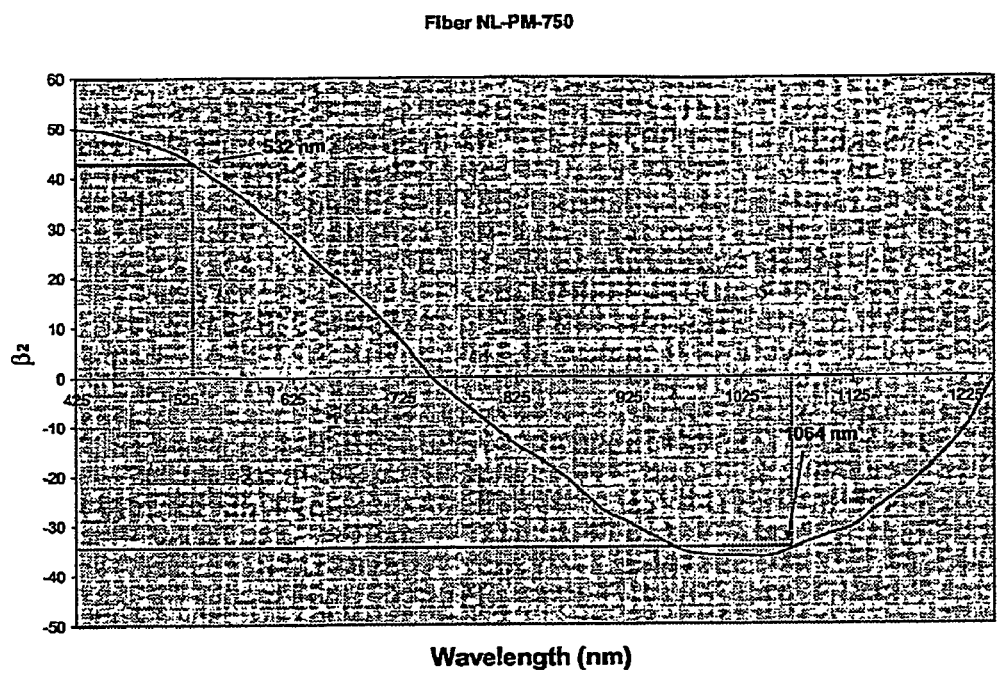
FIG. 5 shows the dispersion parameter versus wavelength of another photonic crystal fibre for which the selection of wavelength is not according to an embodiment of the present invention.

Non-Optimal Dispersion Parameter—Wavelength Combination for Chosen Wavelength FIG. 5 shows the dispersion parameter versus wavelength of another photonic crystal fibre for which the selection of wavelength is not according to an embodiment of the present invention.

As seen from FIG. 5, the negative dispersion parameter at the longer wavelength (1064 nm) is numerically too small to provide a negative sum of dispersion parameters $\beta_{21}+\beta_{22}$ for both wavelengths (532 and 1064 nm). Consequently, for this fibre there is no combination of dispersion parameters at these frequencies doubled wavelengths which will produce a supercontinuum.

Other combinations of wavelengths, however, can provide a negative dispersion factor.

Example 5

Dispersion Parameter—Wavelength Selection for a Standard Fibre

Figure 6:
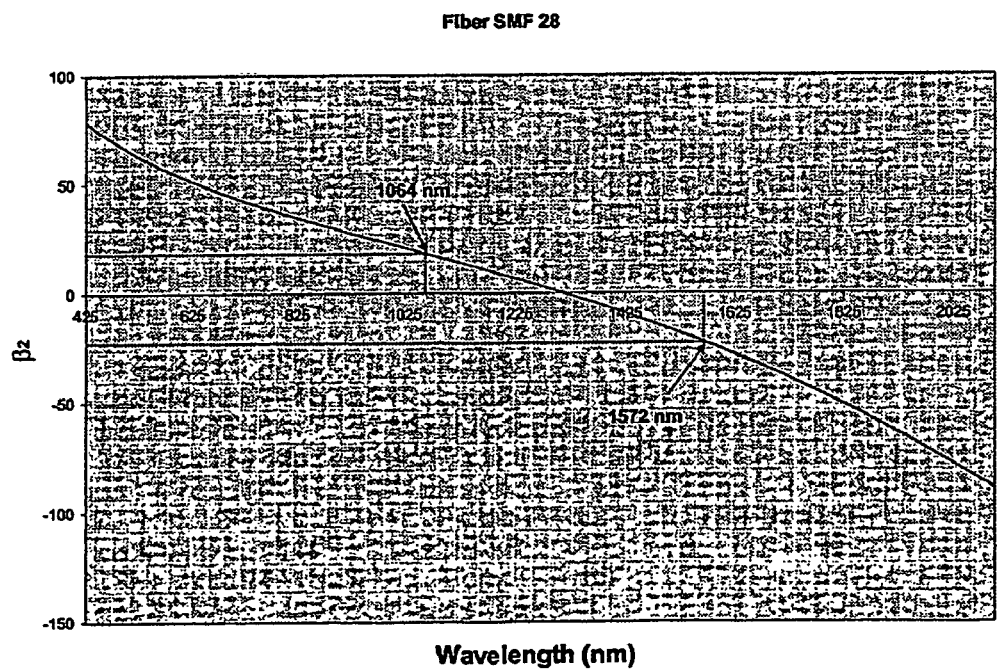
FIG. 6 shows the dispersion parameter versus wavelength of a standard fibre according to an embodiment of the present invention.

FIG. 6 shows the dispersion parameter versus wavelength of a standard fibre according to an embodiment of the present invention.

It is seen that two wavelengths (1572 nm and 1064 nm) can be selected to provide a negative dispersion factor.

In this case the shorter wavelength is generated by a Nd:YAG laser and the longer wavelength is generated by a non-critically phase-matched KTP OPO crystal pumped by the same Nd:YAG laser.

Example 6

A Supercontinuum Light Source

Figure 1B:
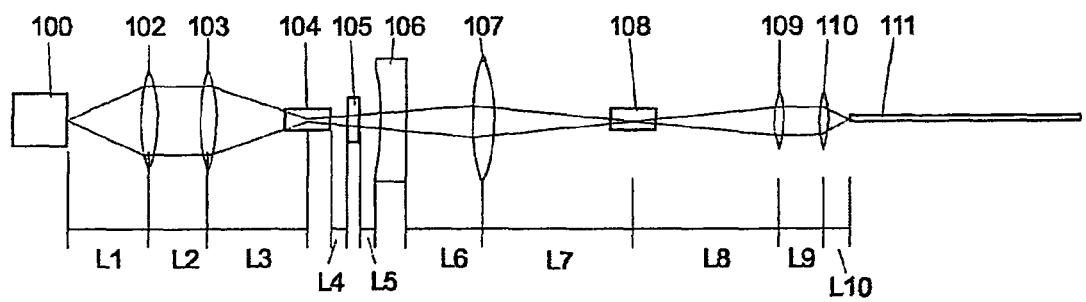

FIG. 1b shows an embodiment of a supercontinuum light source according to the invention for producing a spectrum as shown in FIG. 2b. The supercontinuum light source consists of four sections. The first section (elements 100, 102 through 106 in FIG. 1b) forms a q-switched Nd:YAG laser emitting light at a first wavelength of 1064 nm with a pulse width of 2 ns to 5 ns. The second section (elements 107 and 108 in FIG. 1b) frequency doubles a portion of the 1064 nm light to light of a second wavelength of 532 nm. The third section (elements 109 and 110 in FIG. 1b) forms an optical coupling section for coupling the light at the two wavelengths into the fourth section. The fourth section (element 111 in FIG. 1b) is an optical fiber with a zero dispersion wavelength (i.e. with a dispersion parameter β substantially equal to 0 at said zero dispersion wavelength) between the mentioned first and second wavelengths, here a nonlinear photonic crystal fiber.

The white light source as shown in FIG. 1b is assembled using a diode laser 100 emitting up to 3 W of light in continuous wave mode at a wavelength of 808 nm (JDSU, SDL-2472-P1). A first aspheric lens 102 with a focal length of 3.1 mm (Thorlabs, C330TM) is aligned in front of diode laser 100 in a distance L1 of approximately 8 mm in order to focus the emitted light in a distance of 1 meter from diode laser 100. A second aspheric lens 103 with a focal length of 8 mm (Thorlabs, C240TM) is positioned on axis with the first lens 102 in a distance L2 of 10 mm from the first lens 102. A 5 mm thick Nd:YAG crystal (1% Nd) 104 with a 99.8% reflective coating for 1064 nm light at one end and an anti-reflective coating for 1064 nm light at the other end is positioned on axis with the second lens 103 at a distance L3 of 8 mm from the second lens 103. A 1 mm thick Cr4+:YAG crystal 105 with 70% initial transmission and anti-reflective coatings for 1064 nm light on both optical surfaces is positioned on axis with Nd:YAG crystal 104 in a distance L4 of 0.5 mm from Nd:YAG crystal 104. A laser mirror 106 with a 90% reflective coating for 1064 nm light and a curvature of 500 mm (CASIX, ND00112) is positioned on axis with Cr4+:YAG crystal 105 in a distance L5 of 0.5 mm from Cr4+:YAG crystal 105. With light being emitted from the laser 100, the mirror 106 has to be aligned in order for laser light to be emitted at 1064 nm from the elements 104 through 106. The distance L3 can be optimized for maximum output power out of mirror 106 of light at 1064 nm. A lens 107 with a focal length of 15 mm (Casix, PCXO201) is positioned on axis with mirror 106 at a distance L6 of 30 mm from mirror 106. A 5 mm thick KTP crystal 108 is positioned in the focal point of lens 107 on axis with lens 107 at a distance L7 of approximately 19.5 mm from lens 107. To adapt the phase matching of the first and second wavelengths to achieve the desired output spectrum, the KTP crystal is preferably angle tuned and rotated in order to maximize the conversion of light from 1064 nm to 532 nm. A lens 109 with a focal length of 100 mm (Casix, PCX0208) is positioned on axis with KTP crystal 108 at a distance L8 of 95 mm from KTP crystal 108. A lens 110 with a focal length of 7.5 mm (Thorlabs, AC050-008) is positioned on axis with lens 109 at a distance L9 of 30 mm from lens 109. An optical nonlinear photonic crystal fiber 11 with a length of 10 m with a mode field diameter of 1.5 µm, a numerical aperture of 0.20 and a zero-dispersion wavelength at 650 nm (Crystal Fibre, NL-1.7-650) is positioned with the input facet on axis with lens 110 in a distance L10 of 4.8 mm from lens 110. The position of the two lenses 109 and 110, and the fiber 111 are preferably aligned in order to maximize the coupling of light at both 532 nm and 1064 nm into the fiber.

While the invention has been described with reference to a particular embodiment, it will be understood that the present invention is by no means limited to the particular constructions and methods herein disclosed and/or shown in the drawings, but also comprises any modifications or equivalents within the scope of the claims.

The invention claimed is:

1. A supercontinuum laser radiation source, the source comprising:
   (a) at least one laser radiation source, said at least one laser radiation source being adapted to emit at least a laser radiation of a first wavelength and comprising a frequency doubler arranged to generate a laser radiation of a second wavelength, wherein the second wavelength is shorter than the first wavelength; and
   (b) an optical waveguide having a dispersion characteristic of guided optical radiation, said dispersion characteristic comprising:
      (i) a first dispersion parameter at said first wavelength,
      (ii) a second dispersion parameter at said second shorter wavelength, and
      (iii) a zero-dispersion parameter at a wavelength in between said first and said second shorter wavelengths,
   said optical waveguide being optically connected with said at least one laser radiation source and said frequency doubler to receive said laser radiations at said first and second wavelengths;
   wherein the supercontinuum laser radiation source simultaneously emits supercontinuum optical radiation spanning more than 800 nm and includes wavelengths that are lower than the first wavelength and the second wavelength.

2. The supercontinuum source according to claim 1, wherein said at least one laser radiation source is being pulsed with pulses of duration times in the range including 100 ps to 100 ns.

3. The supercontinuum source according to claim 1, wherein said at least one laser radiation source comprises a Q-switched laser or a mode-locked laser.

4. The supercontinuum source according to claim 1, wherein said at least one laser radiation source comprises a Q-switched Nd:YAG laser.

5. The supercontinuum source according to claim 1, wherein at least one of said at least one laser radiation source is a laser passively Q-switched with a Cr4+:YAG crystal saturable absorber.

6. The supercontinuum source according to claim 1, wherein said at least one laser radiation source comprises a semiconductor saturable absorber.

7. The supercontinuum source according to claim 1, wherein said at least one laser radiation source is a continuous wave laser.

8. The supercontinuum source according to claim 1, wherein said optical waveguide is an optical fibre or a planar waveguide.

9. The supercontinuum source according to claim 8, wherein said optical fibre is a standard optical fibre or a photonic crystal fibre.

10. A method of practicing one of telecommunications, spectroscopy, or optical coherence tomography using the supercontinuum laser radiation source according to claim 1.

11. The supercontinuum source according to claim 1, where said at least one laser source is adapted to emit laser radiation at said first wavelength at a first power and said second wavelength at a second power wherein the laser radiation of said first and second powers differ by at least 10 Watts.

12. The supercontinuum source according to claim 1, wherein said first wavelength is in the range including 1000 to 1100 nm, and said second wavelength is in the range including 500 to 550 nm.

13. The supercontinuum source according to claim 1, wherein said first wavelength is about 1064 nm, and said second wavelength is about 532 nm.

14. The supercontinuum source according to claim 1 wherein the wavelength difference of said first wavelength with respect to said zero-dispersion wavelength differs from the wavelength difference of said second wavelength with respect to said zero-dispersion wavelength.

15. The supercontinuum source according to claim 1 wherein said at least one laser radiation source is a single laser radiation source.

16. The supercontinuum source according to claim 1 wherein two or more of said at least a laser radiation of a first wavelength and a laser radiation of a second wavelength are phase-matched inside said optical waveguide.

* * * * *